Nov. 14, 1967     H. R. CRAVEN     3,352,454
DOUBLE DEPTH ARTICLE RELEASE MECHANISM FOR VENDING MACHINE
Filed April 18, 1966     5 Sheets-Sheet 1
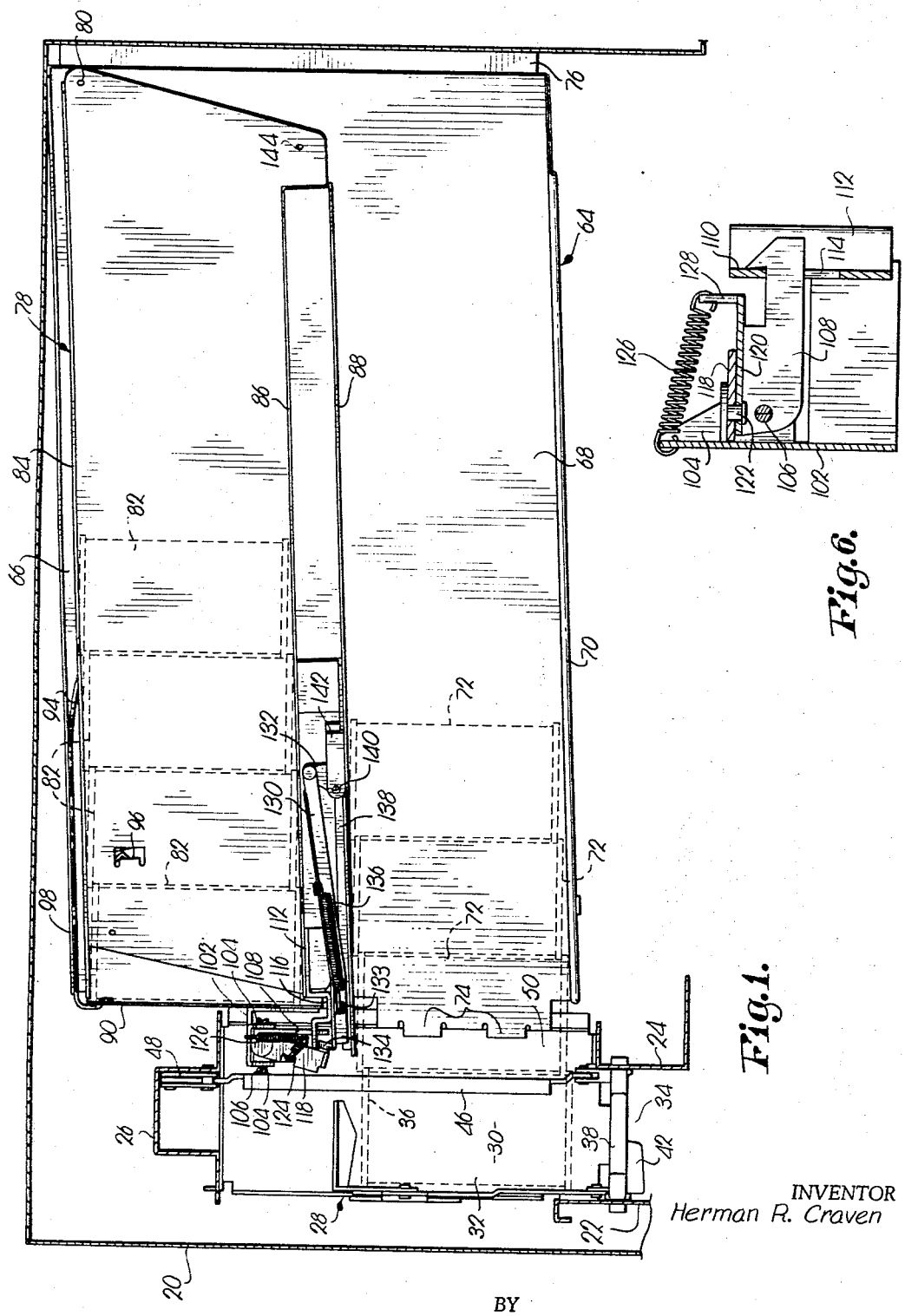
INVENTOR
Herman R. Craven
BY
ATTORNEYS.

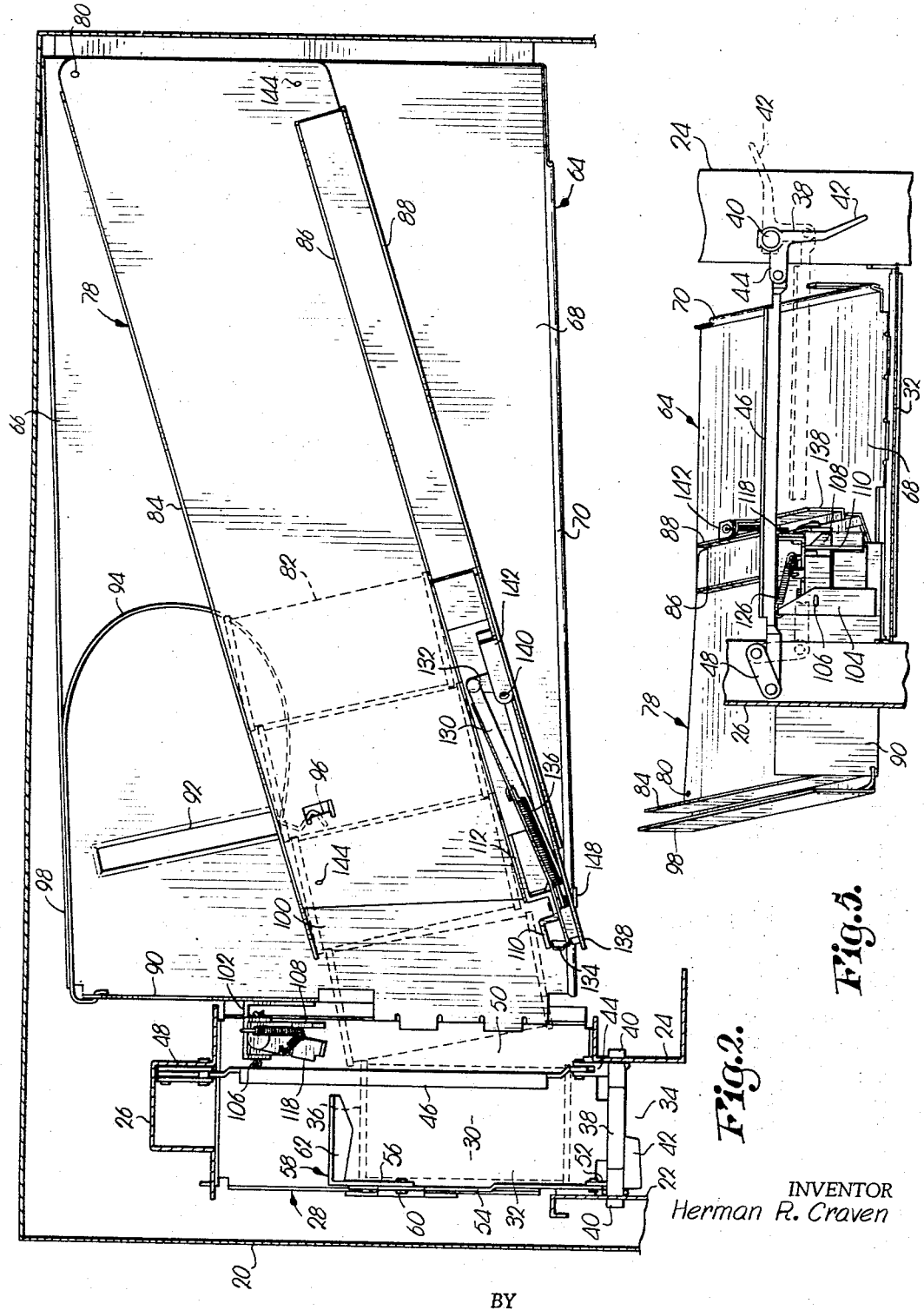

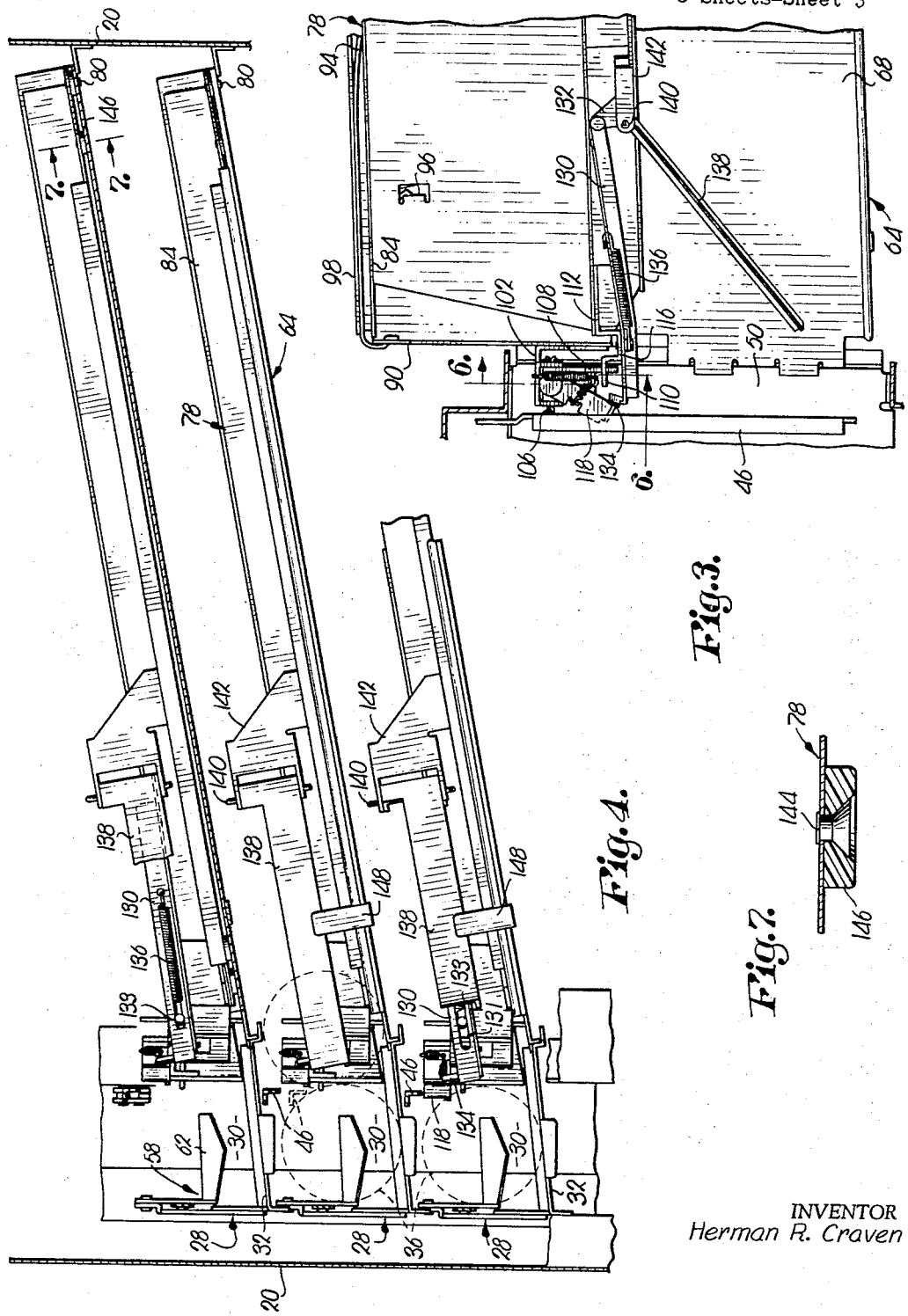

Nov. 14, 1967 H. R. CRAVEN 3,352,454
DOUBLE DEPTH ARTICLE RELEASE MECHANISM FOR VENDING MACHINE
Filed April 18, 1966 5 Sheets-Sheet 4
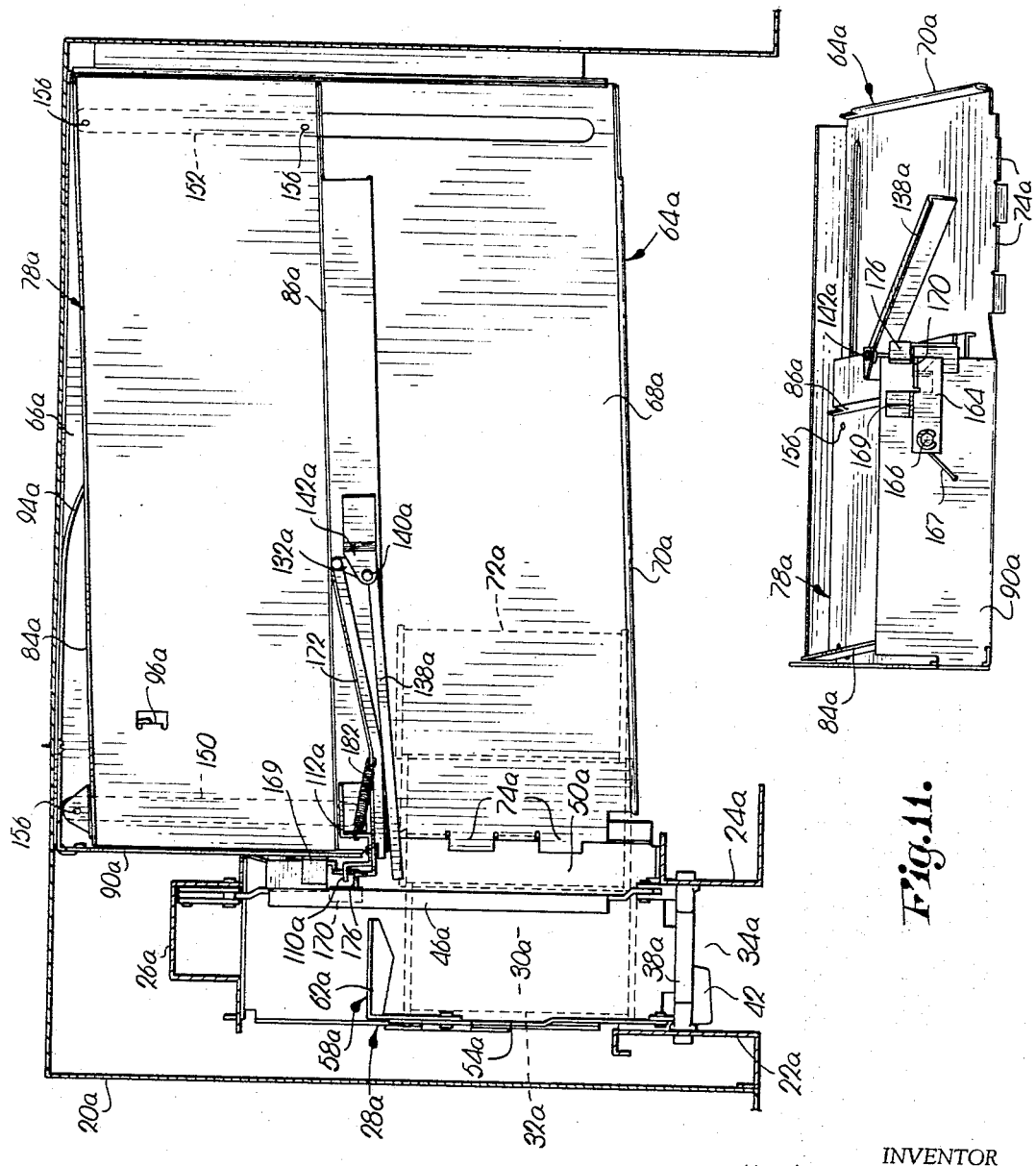
INVENTOR
Herman R. Craven
BY
ATTORNEYS.

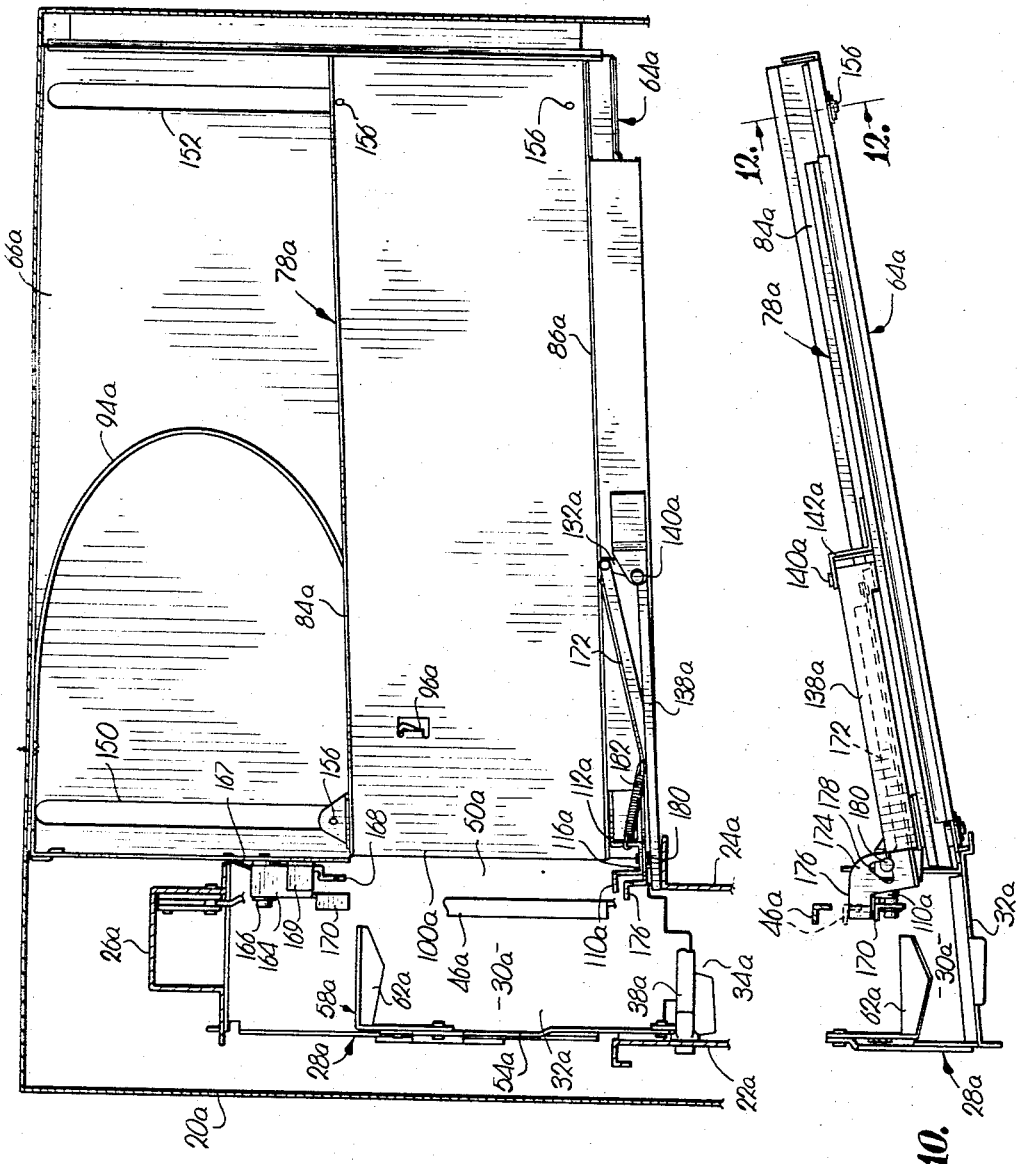

United States Patent Office 3,352,454
Patented Nov. 14, 1967

3,352,454
DOUBLE DEPTH ARTICLE RELEASE MECHANISM FOR VENDING MACHINE
Herman R. Craven, Prairie Village, Kans., assignor to The Vendo Company, Kansas City, Mo., a corporation of Missouri
Filed Apr. 18, 1966, Ser. No. 543,368
8 Claims. (Cl. 221—105)

ABSTRACT OF THE DISCLOSURE

A slant shelf vending machine has a dispensing station for receiving an article to be dispensed, and is provided with a shelf which, when the machine is fully stocked, supports a row of articles to be dispensed and a shiftable carrier containing a second row of articles. When the articles on the shelf are exhausted, the carrier slides over the surface of the shelf to a position placing its articles in alignment with the delivery station for gravitation thereinto. Means is provided to automatically shift the carrier from its normal, article-storing position to its article-feeding position after exhaustion of the first row of articles, the movement of the carrier being initiated by the divider bar of the vendor which is shifted into blocking relationship to the article entrance of the dispensing station during each vending operation. When the last to be dispensed article of the first row enters the dispensing station, the exhausted condition of the shelf is sensed and the carrier shifting means is conditioned for subsequent initiation by the divider bar.

---

This invention relates to apparatus for increasing the capacity of beverage dispensers, particularly slant shelf vendors or dispensers which are adapted to accommodate canned beverages.

An example of a slant shelf vending machine presently in widespread usage is shown in U.S. Letters Patent to Bookout et al., No. 2,766,906, dated Oct. 16, 1956, and entitled, "Selective Bottled Beverage Vending Machine." In machines of this type, bottled beverages to be vended to customers gravitate down an inclined shelf with the lowermost bottle coming to rest in alignment with a delivery opening. The opening is accessible to customers and permits the lowermost bottle to be manually removed from the machine by grasping the neck of the bottle and withdrawing the latter through the opening, after appropriate coinage has been deposited in the machine to effect the release of a control gate which normally prevents the lowermost bottle from being removed.

The popularity, convenience and wide availability of canned beverages led to the development of a slant shelf vending machine which could accommodate the cylindrical can configuration. Craven, U.S. Letters Patent No. 3,190,492, dated June 22, 1965, and entitled "Article Advancement Mechanism For Inclined Shelf Vending Machine," teaches the use of a mechanism for advancing the lowermost can partially through the delivery opening so that the forward end of the can may be readily grasped by a customer. This is required since the absence of a neck of reduced diameter renders a can difficult to grasp and withdraw from within the dispensing station of the machine.

Manifestly, the shorter length and compactness of canned beverages as compared with bottled products is a recognized advantage, and in the vending machine art it is desirable to utilize cabinet space as effectively as possible. In a slant shelf machine the capacity thereof is necessarily directly proportional to the length of each shelf and the number of shelves provided. Therefore, the compactness of cans could be utilized to increase the capacity of such a machine without lengthening the shelves thereof and increasing the breadth of the cabinet, if a multiple depth shelf structure were provided for each dispensing station. However, if a second shelf, for example, is to be provided for each dispensing station, a problem is encountered in providing mechanism for shifting the additional shelf from a standby, storage position to an article-feeding position in proper alignment with the dispensing station after the first shelf is exhausted.

It is, therefore, the primary object of this invention to provide a vending or dispensing machine having a multiple depth article delivery apparatus for feeding articles to a single dispensing station where the article to be dispensed may be manually withdrawn by a consumer.

Another object is to provide a double depth shelf structure for a vending machine of the slant shelf type, particularly adapted for use with canned beverages so that the more compact package configuration may be utilized to maximum advantage.

Still another object is to provide a double depth structure as aforesaid having a primary, stationary shelf for feeding articles to an associated dispensing station, and a secondary, shiftable shelf in the form of an article carrier which automatically moves to an article-feeding position after the primary shelf is exhausted.

Yet another object is to provide the carrier with an article delivery outlet which moves with the carrier into alignment with the article entrance of the dispensing station as the carrier shifts to its article-feeding position.

A further object is to provide a latch device which normally maintains the aforesaid carrier in a standby, storage position, and which is provided with an article sensor that conditions the device for release of the carrier for movement to said article-feeding position when the primary shelf becomes exhausted.

An additional object is to provide a carrier release device as aforesaid which, when conditioned for operation, is actuated by the divider bar of the dispensing station when the last to be dispensed article of the primary shelf is withdrawn through the delivery opening, so that the carrier is released by actuating force applied to the latch device by the consumer in withdrawing the article from the dispensing station.

In the drawings:

FIGURE 1 is a horizontal, sectional view through the cabinet of a vending machine showing the apparatus of the instant invention in plan, the secondary shelf being illustrated in its standby, storage position;

FIG. 2 is a view similar to FIG. 1 showing the secondary shelf in its article-feeding position;

FIG. 3 is a fragmentary, plan view of the apparatus showing the condition of the carrier releasing device after the last to be delivered can of the primary shelf has gravitated into the dispensing station;

FIG. 4 is a fragmentary, front elevational view of the slant shelf apparatus showing three of the double depth shelf structures, the control gates being removed for clarity;

FIG. 5 is a vertical, sectional view through the dispensing station shown in FIG. 1, looking rightwardly toward the double depth shelf structure;

FIG. 6 is an enlarged, detail view taken along line 6—6 of FIG. 3;

FIG. 7 is an enlarged, detail view taken along line 7—7 of FIG. 4;

FIG. 8 is a horizontal, sectional view through the cabinet of a vending machine illustrating a second form of the instant invention in plan and showing the secondary shelf or carrier in its standby, storage position;

FIG. 9 is a view similar to FIG. 8, showing the carrier (of the second form) in its article-feeding position;

FIG. 10 is a front elevational view of the shelf structure of the second form of the invention, showing the condition of the carrier-releasing device after the last to be delivered article of the primary shelf has gravitated into the dispensing station, the control gate being removed for clarity;

FIG. 11 is a side elevational view of the shelf structure of the second form of the invention, showing the same removed from the dispensing station with the carrier-releasing device in the condition illustrated in FIG. 10;

FIG. 12 is an enlarged, detail view taken along line 12—12 of FIG. 10; and

FIG. 13 is a detail of the latch dog shown in FIGS. 8–11.

*The first embodiment—FIGS. 1–7*

The exterior cabinet of the machine is not shown in the drawings, the cabinet liner being illustrated at 20 in FIGS. 1, 2 and 4. A pair of horizontally spaced, upright channel members 22 and 24 are disposed adjacent the front of the cabinet, an upstanding channel member 26 being located toward the rear of the cabinet. These structural members support a number of cradles or racks 28 in vertically spaced relationship to one another (FIG. 4), each rack 28 defining an article dispensing station 30. The various stations and their associated shelf structures are identical in construction.

Rack 28 has a bottom plate 32 which receives individual articles for dispensing through a delivery opening 34 defined in part by the two forward structural members 22 and 24. The articles illustrated by the broken lines in FIGS. 1, 2 and 4 are canned beverages, the can in the dispensing station being designated 36. A control or vend gate 38 is provided with a pair of opposed pintles 40 journalled in members 22 and 24, gate 38 being normally disposed in blocking relationship to delivery opening 34. An operating handle or tab 42 depends from gate 38 when the latter is blocking opening 34, and is disposed to be grasped by a customer to shift the gate forwardly about the horizontal axis provided by pintles 40 (see FIG. 5).

Gate 38 is provided with a bifurcated extension 44 pivotally connected to an elongated, horizontally extending divider bar member 46 having its rearward end swingably secured to member 26 by a pivotal link 48. The linkage arrangement provided by extension 44 and link 48 permits upward and downward movement of divider bar 46 while the latter remains in a horizontal attitude, as illustrated by the full and dash line representations of FIG. 5. Bar 46 is disposed in overlying relationship to the right-hand marginal portion (as viewed in FIGS. 1–3) of bottom plate 32, said portion presenting an entrance 50 permitting passage of articles into the delivery station, as will be described hereinafter. It should be noted that bottom plate 32 is inclined upwardly at a slight angle in the direction of entrance 50.

Gate 38 is also provided with a crank arm 52 which extends therefrom adjacent the left pintle 40, crank arm 52 being pivotally connected to an elongated, horizontally, rearwardly extending link 54 which is pivotally joined at its rearward end to a leg 56 of a generally L-shaped article ejector 58. The forward extremity of leg 56 is secured to the side wall structure of rack 28 by a pivot pin 60, ejector 58 having a pusher leg 62 integral with the rearmost extremity of leg 56 and extending behind the rear end of article 36 as illustrated.

A primary shelf 64 extends away from entrance 50 at a greater inclination than bottom plate 32, and comprises a main plate 66 of approximately rectangular configuration which presents a ramp portion 68 in longitudinal alignment with entrance 50 (FIG. 1). The forward edge of ramp 68 is provided with an upstanding flange 70 and, as illustrated in FIG. 1, serves as a support for articles 72 arranged therealong in side-by-side relationship to one another. Tabs 74 projecting from the left edge of ramp 68 overlie the adjacent edge of bottom plate 32 and assist in securing shelf 64 to the dispensing station. An angle member 76 is secured to the right wall of liner 20 and extends from front to rear beneath the upper edge of plate 66 to support the latter.

A secondary shelf 78 in the form of an elongated, transversely U-shaped carrier overlies plate 66 and is secured thereto by a pivot 80 at the right rear corners of carrier 78 and plate 66. Pivot 80 provides an upright axis for swinging movement of carrier 78 between the positions illustrated in FIGS. 1 and 2. A row of articles 82 are supported by carrier 78 and are held against forward or rearward displacement by an upstanding flange 84 extending along the rear edge of carrier 78 and an upstanding flange 86 adjacent the front edge 88 thereof. A stop plate 90 extends upwardly from the rearward portion of the left edge of main plate 66 and prevents gravitation of articles 82 from carrier 78 when the latter is in the standby, storage position illustrated in FIG. 1.

Plate 66 has an elongated slot 92 therein which serves as a clearance opening for the connection of a drive spring 94 to an ear 96 depending from carrier 78. Drive spring 94 is formed from heavy wire stock and is normally in high compression as illustrated in FIG. 1. The opposite end of spring 94 is secured to the rear margin 98 of plate 66, beneath carrier 78 as shown.

As is shown most clearly in FIG. 2, the lower end of carrier 78 remote from pivot 80 defines an article delivery outlet 100 which is in alignment with entrance 50, when the carrier is shifted by spring 94 to its article-feeding position. This occurs subsequent to exhaustion of articles 72 from ramp 68 of the primary shelf.

A mounting bracket 102 of angle member configuration, as viewed in FIGS. 1 and 2, is secured to the forward edge portion of stop plate 90, one leg of bracket 102 projecting leftwardly away from the shelf structure. Bracket 102 is provided with a pair of forwardly projecting flanges 104 having a cotter 106 extending therebetween and mounting a latch dog 108 for swinging movement about the axis thereof (see FIG. 6). Dog 108 is engageable with the tip 110 of a latch element 112 through an opening 114 therein. Latch element 112 is secured to the left end of flange 86 and has an offset portion 116 enabling element 112 to extend around stop plate 90 for engagement by dog 108 when carrier 78 is in its storage position.

An elongated component in the form of a finger 118 is pivotally mounted at one end thereof to a top flange 120 forming a part of dog 108. A pin 122 extending through flange 120 permits swinging movement of the finger 118 about a vertical axis as may be seen by a comparison of FIGS. 1 and 3. A spring 124 normally maintains finger 118 in the FIG. 1 position; a spring 126 extends between bracket 102 and a projection 128 of top flange 120 for the purpose of normally maintaining dog 108 in the position shown most clearly in FIG. 6.

An elongated actuator arm 130 is disposed in overlying relationship to the portion of carrier 78 between flange 86 and edge 88 adjacent the lower end of the carrier, the upper end of arm 130 being pivotally connected to a crank 132, while the lower end thereof is configured to present a pusher 134 engageable with the proximal end of finger 118. A spring 136 biases arm 130 toward finger 118, arm 130 normally being held against movement under the action of spring 136 by an elongated article sensor 138 rigid with crank 132 and held by a pivot pin 140 carried by a bracket 142 rigid with edge 88 of carrier 78.

Sensor 138, in the position thereof illustrated in FIG. 1, extends downwardly toward station 30 in overlying relationship to edge 88 and is engaged by one or more of the lowermost cans 72 on ramp 68. It will be appreciated that, when ramp 68 is exhausted, as illustrated in FIG. 3, sensor 138 will free arm 130 for movement under the action of spring 136, thereby bringing pusher 134 into engagement with finger 118. This shifts the finger into the path of travel of divider bar 46 so that, during the next dispensing operation, finger 118 will be engaged by bar 46 as it moves downwardly from the full line to the broken line position thereof illustrated in FIG. 5, resulting in disengagement of latch dog 108 and latch element 112 to permit carrier 78 to swing to its article-feeding position illustrated in FIG. 2. Note that movement of arm 130 is confined to a rectilinear path by an elongated slot 131 therein extending longitudinally of arm 130 and receiving a pin 133 projecting forwardly from offset portion 116 of latch element 112, the lower end of spring 136 being anchored to pin 133.

The undersurface of carrier 78 at the three corners thereof other than the corner associated with pivot pin 80 is provided with three nylon feet secured thereto by rivets 144. One of the feet is shown in detail at 146 in FIG. 7. The lower surfaces of feet 146 bear against plate 66 to provide low friction contact between the primary and secondary shelves so that carrier 78 is free to slide across plate 66 under the action of spring 94 with minimum resistance.

An upstanding stop 148 is rigid with the forward flange 70 of plate 66 adjacent the lower end of the latter, and serves to retract article sensor 138 after carrier 78 is released for movement to its article-feeding position. In FIG. 2, it may be seen that the lower end portion of sensor 138 will move into engagement with stop 148 during the shifting of the carrier and will reach a final position which fully withdraws actuator arm 130 and places spring 136 in tension.

*Operation of the first embodiment*

Unlocking of control gate 38 of the selected station 30 is effected by conventional coin-controlled mechanism well known in the vending machine art. The gate is shifted to an open position clearing delivery opening 34 by manually raising handle 42 to the broken line position illustrated in FIG. 5. This shifts pusher leg 62 of ejector 58 forwardly to push can 36 partially through opening 34 where it may be readily grasped and withdrawn by the customer. The action of the control gate and ejector mechanism is described in detail in the aforesaid Craven patent which is incorporated herein by reference as may be necessary for a full and complete understanding of the manner in which can 36 is dispensed from station 30.

Simultaneously with movement of control gate 38 to the open position, divider bar 46 is lowered by the action of the linkage formed by extension 44 and link 48 to the broken line position illustrated in FIGS. 4 and 5. This blocks entrance 50 and precludes delivery of a can to the dispensing station by either of the shelves 64 or 78. Thus, the next can to be dispensed will not gravitate onto plate 32 until after control gate 38 is returned to the closed position, whereupon reopening of the gate is precluded by a lock (not shown) associated with the coin-controlled mechanism until additional coinage is deposited. Positive return of gate 38 to its closed position may be effected through the use of a return spring which may be connected to ejector 58, as illustrated in the aforesaid Craven patent.

When the last to be dispensed can 72 gravitates from ramp 68 onto bottom plate 32 of dispensing station 30, article sensor 138 can no longer hold arm 130 against the action of spring 136. This permits the moving parts of the carrier release device to shift from the positions illustrated in FIG. 1 to the positions shown in FIG. 3, where it may be seen that sensor 138 now overlies a portion of ramp 68 where cans were previously located.

Arm 130 has shifted leftwardly under the action of spring 136 to bring pusher 134 into engagement with finger 118, thereby swinging the latter in a clockwise direction against the action of its return spring 124. As is apparent in FIG. 3 and the illustration of the lowermost dispensing station 30 in FIG. 4, finger 118 now directly underlies divider bar 46. Therefore, when the last can 72 is dispensed, divider bar 46 will move into engagement with finger 118 to force latch dog 108 downwardly about cotter 106 until latch element 112 is released. This permits carrier 78 to swing about pivot 80 in a counterclockwise direction under the action of drive spring 94 until the carrier comes to rest in the position illustrated in FIG. 2. It will be appreciated that outlet 100 is now aligned with entrance 50 and is no longer blocked by stop plate 90; therefore, cans 82 will now successively gravitate into the dispensing station in accordance with the demand. Note also that, during swinging of carrier 78 by spring 94, sensor 138 moves into engagement with stop 148 to retract the sensor to substantially the same position relative to carrier 78 as before, thereby also withdrawing arm 130 and its pusher 134 by the action of crank 132.

When both the primary and secondary shelves are exhausted and it is desired to reload the shelf structure, the secondary shelf (carrier 78) is moved by hand against the action of spring 94 until latch dog 108 and latch element 112 relock. As ramp 68 is reloaded, sensor 138 will once again be held in the position thereof illustrated in FIG. 1 by the presence of cans 72.

*The second embodiment—FIGS. 8–13*

The second form of the instant invention is similar in structure and operation to that as described above for the first embodiment. Therefore, the components of the second embodiment which are similar or identical in structural configuration to components of the first embodiment, and function in the same manner, are designated by the same reference characters as used hereinabove with the addition of the "*a*" notation. For this reason, only the distinctive features of the second embodiment will be described in detail.

Main plate 66*a* of the primary shelf 64*a* has a pair of elongated, parallel slots 150 and 152 therein adjacent the lower and upper ends thereof respectively. Slot 150 extends approximately half the distance from rear to front across plate 66*a*, while slot 152 extends substantially the entire distance across plate 66*a* and in parallelism with slot 150.

Carrier 78*a* is provided with three nylon slide bushings on the underside thereof at the three corners of the carrier other than the lower, forwardmost corner thereof. One of the bushings is illustrated in detail in FIG. 12 and is designated 154. Rivets 156 are utilized to secure bushings 154 to respective corners of the carrier. Each bushing has a lower, reduced section 158 which is received by the underlying slot 150 or 152 and held in such slot by a washer 160 and retainer 162 on rivet 156. Thus, slots 150 and 152 provide a rectilinear track for carrier 78*a* in which the carrier rides during movement between the standby, storage position shown in FIGS. 8 and 11, and the article-feeding position shown in FIG. 9. For four corner stabilization, a foot such as illustrated at 146 in FIG. 7, may be located beneath carrier 78*a* adjacent the unsupported corner thereof.

The latch device of the second embodiment includes a latch dog 164 pivotally mounted on a pin 166 projecting from stop plate 90*a*. A return spring 167 is connected between stop plate 90*a* and dog 164 and normally holds the latter against a stop 169. Dog 164 is configured to present a hook 168 spaced forwardly of the axis of rotation of dog 164, and an outturned tab 170 adjacent hook 168. When carrier 78*a* is held in its storage position, hook 168 engages the tip 110*a* of latch element 112*a* in a manner analogous to that as described above for the first embodiment. It should be noted that tab 170 underlies divider bar 46*a* but is in sufficiently downwardly spaced relationship thereto to avoid contact by the divider bar when the latter is in its lowermost position. In this regard, see particularly FIG. 10 where divider bar 46*a* is illustrated in broken lines as it approaches its lowermost position, spaced well above tab 170.

An elongated component in the form of a leg 172 having a bend adjacent the central portion thereof, is pivotally joined at one end to crank 132*a*. The other, lower end of leg 172 has an upstanding portion 174 (FIG. 10) provided with a Z-shaped projection 176. Portion 174 has a triangular opening 178 therein receiving a pin 180 extending forwardly from offset portion 116a of latch element 112a. A spring 182 is connected between leg 172 and element 112a and biases the leg toward dispensing station 30a. Leg 172 is normally held against movement under the action of spring 182 by virtue of engagement of sensor 138a with cans 72a but, when ramp 68a is exhausted, spring 182 shifts leg 172 to a position where projection 176 is disposed between divider bar 46a and tab 170, as is most clear in FIG. 10.

*Operation of the second embodiment*

When the last to be dispensed can 72a gravitates into dispensing station 30a, sensor 138a is so longer held and releases leg 172 for movement under the action of spring 182. This swings sensor 138a about pin 140a and displaces leg 172 a distance limited by the horizontal dimension of opening 178. Projection 176, prior to release of leg 172, is in the position illustrated in FIG. 8 in clearing relationship to tab 170. However, when leg 172 is released, projection 176 moves into overlying relationship to tab 170 and still clears the latter but is only slightly spaced thereabove.

The interconnection of crank 132a and leg 172 is purposely made with sufficient play to permit projection 176 to be forced downwardly by engagement of divider bar 46a therewith when dispensing of the last article 72a subsequently occurs. This forces the lower edge of projection 176 into engagement with tab 170 to depress the latter and swing dog 164 in a downwardly direction about the pivotal axis defined by pin 166. This releases hook 168 from tip 110a to allow carrier 78a to be driven to its article-feeding position by drive spring 94a. It may be seen in FIG. 9 that, unlike the first embodiment described above, carrier 78a moves along a rectilinear path defined by slots 150 and 152 into overlying relationship to ramp 68a, the axis of inclination of carrier 78a remaining at all times parallel to the axis of inclination of ramp 68a. In this manner, the carrier is effectively superimposed on ramp 68a with outlet 100a disposed to direct articles into station 30a through entrance 50a along substantially the same feed path as ramp 68a.

As carrier 78a reaches its article-feeding position, the lower end of sensor 138a moves into engagement with channel member 24a, the latter serving as a stop to retract the sensor and withdraw projection 176. In this manner, projection 176 is moved to substantially the same position relative to carrier 78a as before, and is not engaged by divider bar 46a during subsequent dispensing of articles fed from carrier 78a.

Having thus described the invention, what is claimed as new and desired to be secured by Letters Patent is:

1. In a dispensing machine:
a dispensing station for receiving an article to be dispensed, and having means presenting an opening for manual removal of said articles therethrough,
said station being provided with means defining an entrance for passage of articles thereinto;
a primary article-supporting and delivery structure adjacent said station for successively feeding articles supported thereby to said station through said entrance;
a secondary, shiftable article-supporting and delivery structure for successively feeding articles supported thereby to said station after exhaustion of said first structure;
means mounting said secondary structure for movement from a normal, article-storing position clearing the articles supported by said first structure to an article-feeding position where the secondary structure is disposed to direct articles therefrom toward said entrance;
means coupled with said secondary structure and operable after exhaustion of the first structure for shifting the secondary structure form said normal position to said article-feeding position;
a shiftable member mounted for movement along a path of travel toward and away from a disposition in blocking relationship to said entrance; and
consumer actuated means coupled with said member for shifting the latter to said disposition during dispensing of an article from said station,
said secondary structure shifting means including means biasing the secondary structure toward said article-feeding position, and a device for releasably maintaining said secondary structure in said normal position against the action of said biasing means,
said device having an article sensor for detecting delivery to said station of the last to be delivered article from said primary structure, a shiftable component mounted for movement into said path in response to said detection of delivery of the last to be delivered article from said primary structure, whereby subsequent dispensing of the last-mentioned article causes engagement of said member and said component, and means responsive to said engagement for releasing said secondary structure for movement to said article-feeding position under the action of said biasing means.

2. The invention of claim 1,
said releasing means including a latch element carried by said secondary structure, a shiftable latch dog engageable with said element, and means mounting said dog in spaced relationship to said path,
said component being operably associated with said dog and transmitting force thereto, upon engagement of the component by said member, to shift the dog out of engagement with said element.

3. The invention of claim 2,
said component being mounted on said dog,
said device including an actuator arm carried by said secondary structure and mounted for movement into engagement with said component to shift the latter into said path, and yieldable means coupled with said arm and biasing the latter toward said component,
said sensor being coupled with said arm and engageable with successive articles fed by the primary structure for holding the arm against movement by said yieldable means until said last to be delivered article moves out of engagement with the sensor.

4. The invention of claim 2,
said component being carried by said secondary structure and engageable with said dog,
said device including yieldable means coupled with said component and biasing the latter toward said path,
said sensor being coupled with said component and engageable with successive articles fed by the primary structure for holding the component against movement by said yieldable means until said last to be delivered article moves out of engagement with the sensor.

5. In a dispensing machine:
a dispensing station for receiving an article to be dispensed, and having means presenting an opening for manual removal of said article therethrough,
said station being provided with means defining an entrance for passage of articles thereinto;
an article-supporting and delivery structure adjacent said station for successively feeding articles supported thereby to said station through said entrance, and including an inclined shelf having an article-supporting ramp extending away from said entrance;
an inclined, shiftable, article-supporting and delivery carrier for successively feeding articles supported thereby to said station after exhaustion of said structure, said carrier having an article delivery outlet;
means mounting said carrier for movement from a normal, article-storing position clearing the articles supported by said ramp to an article-feeding position in overlying relationship to at least a portion of said ramp with said outlet aligned with said entrance;

means coupled with said carrier and operable after exhaustion of said structure for shifting the carrier from said normal position to said article-feeding position;

a shiftable member mounted for movement along a path of travel toward and away from a disposition in blocking relationship to said entrance; and consumer-actuated means coupled with said member for shifting the latter to said disposition during dispensing of an article from said station, said carrier shifting means including drive means biasing the carrier toward said article-feeding position, and a device for releasably maintaining said carrier in said normal position against the action of said drive means, said device having a shiftable article sensor carried by said carrier and engageable with successive articles fed into said entrance by said structure for detecting delivery to said station of the last to be delivered article from said structure, yieldable means coupled with said sensor and biasing the latter toward the articles supported by said structure, whereby the sensor shifts under the action of said yieldable means upon delivery of said last to be delivered article, a shiftable component mounted for movement into said path in response to said shifting of the sensor, whereby subsequent dispensing of the last-mentioned article causes engagement of said member and said component, means responsive to said engagement for releasing said carrier for movement to said article-feeding position under the action of said drive means, and means disposed to engage said sensor, as the carrier moves toward said article-feeding position, to shift the sensor against the action of said yieldable means, whereby to return the sensor to a disposition relative to the carrier corresponding to the position assumed by the sensor prior to detection of delivery of the last to be delivered article from said structure.

6. In a dispensing machine:

a dispensing station for receiving an article to be dispensed, and having means presenting an opening for manual removal of said article therethrough, said station being provided with means defining an entrance for passage of articles thereinto;

an article-supporting and delivery structure adjacent said station for successively feeding articles supported thereby to said station through said entrance, and including an inclined, primary shelf having an elongated, article-supporting ramp portion extending away from said entrance in longitudinal alignment therewith, said structure including a divider member shiftable into disposition blocking movement of articles from the structure to the station while an article is being manually removed from the station;

a secondary, inclined, shiftable, article-supporting and delivery shelf for successively feeding articles supported thereby to said station after exhaustion of said structure, said secondary shelf having an article delivery outlet;

means mounting said secondary shelf on said primary shelf for sliding movement over the primary shelf from a normal, article-storing position along side said ramp portion clearing the articles supported thereby, to an article-feeding position in overlying relationship to at least a part of said ramp portion with said outlet aligned with said entrance; and means for sensing exhaustion of articles from the primary shelf of said structure and thereafter operable by the divider member during shifting of the same toward the article blocking disposition thereof to effect shifting of the secondary shelf from said normal position to said article-feeding position.

7. The invention of claim 6, said secondary shelf being elongated in configuration in the direction of inclination thereof and having an upper end and a lower end, the latter defining said outlet, said mounting means including a pivot adjacent said upper end and mounting said carrier secondary shelf for swinging movement between said positions thereof, and a plurality of antifriction feet depending from said secondary shelf, engaging said primary shelf and supporting the secondary shelf for said sliding movement thereon.

8. The invention of claim 6, said secondary shelf being elongated in configuration in the direction of inclination thereof and having an upper end and a lower end, the latter defining said outlet, said primary shelf having a rectilinear track extending transversely of said ramp portion, said mounting means including elements slidable along said track and rigid with said secondary shelf, mounting the latter with the longitudinal axis thereof in substantial parallelism with the longitudinal axis of said ramp portion.

References Cited

UNITED STATES PATENTS

| 2,254,841 | 9/1941 | Gabrielsen | 221—11 |
| 2,255,007 | 9/1941 | Greene et al. | 221—11 |
| 2,379,501 | 7/1945 | Steiner et al. | 221—11 |
| 2,585,872 | 2/1952 | Steiner et al. | 221—11 |
| 2,925,307 | 2/1960 | Stoner | 221—105 |
| 3,190,492 | 6/1965 | Craven | 221—87 |

FOREIGN PATENTS

| 833,104 | 4/1960 | Great Britain. |
| 605,360 | 3/1959 | Italy. |

WALTER SOBIN, *Primary Examiner.*